US012570848B2

(12) United States Patent
Di Lena et al.

(10) Patent No.: US 12,570,848 B2
(45) Date of Patent: Mar. 10, 2026

(54) SCRATCH-RESISTANT HIGH IMPACT STRENGTH PMMA COMPOSITIONS

(71) Applicant: SHPP Global Technologies B.V., Bergen op Zoom (NL)

(72) Inventors: Fabio Di Lena, Bergen op Zoom (NL); Roland Assink, Bergen op Zoom (NL); Mark Van Der Mee, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 585 days.

(21) Appl. No.: 18/003,354

(22) PCT Filed: Jun. 30, 2021

(86) PCT No.: PCT/IB2021/055877

§ 371 (c)(1),
(2) Date: Dec. 27, 2022

(87) PCT Pub. No.: WO2022/003600

PCT Pub. Date: Jan. 6, 2022

(65) Prior Publication Data

US 2023/0242751 A1 Aug. 3, 2023

(30) Foreign Application Priority Data

Jun. 30, 2020 (EP) .................................... 20183072

(51) Int. Cl.
*C08L 33/12* (2006.01)
*C08L 69/00* (2006.01)
*C08L 83/10* (2006.01)

(52) U.S. Cl.
CPC ........... *C08L 33/12* (2013.01); *C08L 2203/16* (2013.01); *C08L 2203/30* (2013.01); *C08L 2205/03* (2013.01)

(58) Field of Classification Search
CPC ....... C08L 33/12; C08L 83/10; C08L 2205/03
See application file for complete search history.

(56) References Cited

U.S. PATENT DOCUMENTS 4,478,981 A 10/1984 Arkles
9,938,404 B2 4/2018 Lee
2005/0101757 A1* 5/2005 Glasgow ................. C08L 69/00 528/196
2013/0184375 A1 7/2013 Aoyama et al.
2013/0345347 A1* 12/2013 Steendam ............... C08L 69/00 524/151

FOREIGN PATENT DOCUMENTS

| | | |
|---|---|---|
| CN | 107109042 | 8/2017 |
| CN | 109153838 | 1/2019 |
| CN | 111073191 | 4/2020 |
| EP | 3211039 | 8/2017 |
| EP | 3643747 | 4/2020 |
| EP | 3643748 | 4/2020 |
| EP | 3689965 | 8/2020 |
| EP | 3730549 | 10/2020 |
| EP | 3643749 | 4/2021 |
| EP | 4172266 | 5/2023 |
| KR | 20150074563 | 7/2015 |
| WO | WO 2008/042500 | 4/2008 |
| WO | WO 2010/076680 | 7/2010 |
| WO | WO 2016/174592 | 11/2016 |
| WO | WO 2017/178210 | 10/2017 |
| WO | WO 2020/084495 | 4/2020 |

OTHER PUBLICATIONS

International Search Report issued in corresponding PCT Application No. PCT/IB2021/055877, mailed Sep. 29, 2021.
Pesetskii et al. "Compatibility, adhesional interaction of components, impact strength, and rheological behavior of polycarbonate/polycarbonate-siloxane block copolymer", *Journal of Applied Polymer Science*, vol. 78, No. 4, pp. 858-869, 2000.
Office Action issued in corresponding Chinese Application No. 202180052744.6 filed Dec. 8, 2023.

* cited by examiner

*Primary Examiner* — Michael J Feely
(74) *Attorney, Agent, or Firm* — NORTON ROSE FULBRIGHT US LLP

(57) ABSTRACT

Thermoplastic compositions, methods of making the compositions, and composites including the compositions are described. The thermoplastic compositions can contain 55 wt. % to 85 wt. % of a poly(methyl methacrylate) (PMMA) or copolymers thereof, 2 wt. % to 25 wt. % of a poly(carbonate-siloxane) copolymer having a siloxane content of 30 wt. % to 50 wt. %, and an acrylic copolymer based impact modifier.

18 Claims, No Drawings

SCRATCH-RESISTANT HIGH IMPACT STRENGTH PMMA COMPOSITIONS

CROSS-REFERENCE TO RELATED APPLICATIONS

This application is a national phase application under 35 U.S.C. § 371 of International Application No. PCT/IB2021/055877 filed Jun. 30, 2021, which claims the benefit of priority of European Patent Application No. 20183072.6 filed 30 Jun. 2020, which are hereby incorporated by reference in their entirety.

BACKGROUND OF THE INVENTION

A. Field of the Invention

The invention generally relates to scratch resistant, high impact strength thermoplastic compositions. In one aspect, the thermoplastic compositions of the present invention can include 55 wt. % to 85 wt. % of a poly(methyl methacrylate) (PMMA) or copolymers thereof, 2 wt. % to 25 wt. % of a poly(carbonate-siloxane) copolymer having a siloxane content of 30 wt. % to 50 wt. %, and an acrylic copolymer based impact modifier.

B. Description of Related Art

Polymethyl methacrylate (PMMA) has been a material of choice for scratch resistant and transparent or high gloss thermoplastic compositions. One of the problems associated with PMMA, however, is that may have low impact strength. By comparison, bisphenol A polycarbonate (PC) polymers typically have comparatively better impact strength properties than PMMA. Some PC polymers may, however, typically lack good scratch resistance properties.

Attempts have been made to create blends of PMMA and PC polymers in hopes of achieving a polymer composition that has both good scratch resistant and impact strength properties. See, e.g., U.S. Pat. No. 4,478,981. Such attempts, however, may fail to achieve the desired properties, especially for demanding uses or applications in the automotive (e.g., automotive interior or exterior trims) or electronic device (e.g., electronics housings) fields. While additives can be used with these blends, such additives may not be sufficient to increase the scratch resistant and impact strength properties of the resulting composition for use in such demanding applications.

SUMMARY OF THE INVENTION

A discovery has been made that provides a solution to at least some of the problems that may be associated with PMMA and PC containing thermoplastic compositions. In one aspect, the discovery can include providing a thermoplastic composition having particular amounts of PMMA and poly(carbonate-siloxane) copolymer in combination with an acrylic copolymer based impact modifier(s). In some particular aspects, the acrylic copolymer based impact modifier can be a butyl acrylate polymer, a methyl methacrylate polymer, or a combination thereof that can include a multilayer structure of both butyl acrylate and methyl methacrylate polymers. As illustrated in a non-limiting manner in the examples, thermoplastic compositions having 55 wt. % to 85 wt. % of PMMA or copolymers thereof, 2 wt. % to 25 wt. % of a poly(carbonate-siloxane) copolymer having a siloxane content of 30 wt. % to 50 wt. %, and an acrylic copolymer based impact modifier have potentially good scratch resistant and impact strength properties. For example, such compositions can have a notched Charpy impact strength greater than 7 $kJ/m^2$; or equal to or greater than 8 $kJ/m^2$ at 23° C. 4.2 J as measured in accordance with ISO 179/1 and a pencil hardness as specified by D3363-92A of at least H at 0.75 kgf. These properties may allow the compositions of the present invention to be used successfully in demanding fields such as those described above (e.g., automotive (e.g., automotive interior or exterior trims) or electronic device (e.g., electronics housings) fields).

One aspect of the present invention is directed to a thermoplastic composition. The thermoplastic composition can contain poly(methyl methacrylate) (PMMA) or copolymers thereof, a poly(carbonate-siloxane) copolymer, and an acrylic copolymer based impact modifier. The acrylic copolymer based impact modifier can contain an acrylic copolymer. The acrylic copolymer based impact modifier can be different from the PMMA or copolymers thereof, and can contain acrylic graft copolymers. In some aspects, the acrylic copolymer based impact modifier can have a multilayer structure containing a core and at least one shell. In some aspects, the multilayer impact modifier can contain two shells, an inner shell surrounding the core and an outer shell surrounding the inner shell. In some aspects, the multilayer impact modifier can contain a butyl acrylate polymer containing core, a butyl acrylate polymer containing an inner shell surrounding the core, and a methyl methacrylate polymer containing outer shell surrounding the inner shell. In some aspects, the core and the inner shell can be elastomeric, and the outer shell can be rigid. In some aspects, the acrylic copolymer based impact modifier can contain acrylic-styrene-acrylonitrile (ASA) polymer. In some aspects, the thermoplastic composition can include 55 wt. % to 85 wt. % of the poly(methyl methacrylate) (PMMA) or copolymers thereof, 2 wt. % to 25 wt. % of the poly(carbonate-siloxane) copolymer, and the acrylic copolymer based impact modifier. In some aspects, the thermoplastic composition can include 3 wt. % to 35 wt. % of the impact modifier. In some aspects, the thermoplastic composition can contain 60 wt. % to 80 wt. %, preferably 65 wt. % to 75 wt. %, of the PMMA or copolymers thereof; 2 wt. % to 20 wt. %, preferably 2 wt. % to 18 wt. % of the poly(carbonate-siloxane) copolymer; and 10 wt. % to 30 wt. %, preferably 12 wt. % to 28 wt. %, of the acrylic copolymer based multilayer impact modifier. In some aspects, the thermoplastic composition can contain 60 wt. % to 80 wt. %, preferably 65 wt. % to 75 wt. %, of the PMMA or copolymers thereof; 12 wt. % to 25 wt. %, of the poly(carbonate-siloxane) copolymer; and 3 wt. % to 18 wt. %, of the acrylic copolymer based impact modifier containing acrylic-styrene-acrylonitrile (ASA) polymer. In some aspects, the poly(carbonate-siloxane) copolymer can have a siloxane content of 30 wt. % to 50 wt. %, preferably 35 wt. % to 45 wt. %, more preferably 37 wt. % to 43 wt. %, based on the total weight of the poly(carbonate-siloxane) copolymer. In some aspects, the poly(carbonate-siloxane) copolymer can have a siloxane content of about 40 wt. %, based on the total weight of the poly(carbonate-siloxane) copolymer. In some aspects, the acrylic copolymer based impact modifier can have a refractive index of 1.45 to 1.55 or 1.47 to 1.51 or about 1.49. In some aspects, the ratio of refractive indexes of the PMMA or copolymer thereof, and the acrylic copolymer based impact modifier can be 1.05:1 to 1:1.05. The thermoplastic composition can further contain one or more additives selected from the group consisting of a scratch-resistance agent, an antioxidant, a flame retardant, an UV absorber, a photochemical stabilizer, a filler, an optical brightener, a surfactant, a processing aid, a mold release agent, a pigment, or any combinations thereof. In some aspects, the thermoplastic composition can contain an antioxidant, a flame retardant, an UV absorber, a mold release agent, or a pigment or any combination thereof. In some aspects, the antioxidant can be a sterically hindered phenolic primary antioxidant. In some aspects, the antioxidant can be octadecyl-3-[3,5-di-tert-butyl-4-hydroxyphenyl]propionate]. In some aspects, the flame retardant can be a organophosphate containing flame retardant. In some aspects, the flame retardant can be tris-isobutylated triphenyl phosphate. In some aspects, the UV absorber can be benzotriazoles containing UV absorber. In some aspects, the mold release agent can be pentaerythritol tetrastearate. In some aspects, the pigment can contain an anthraquinone-based green colorant and/or a perinone-based solvent dye. In one particular aspect, the thermoplastic composition can contain 55 wt. % to 85 wt. % of the poly(methyl methacrylate) (PMMA) or copolymers thereof, 2 wt. % to 25 wt. % of the poly (carbonate-siloxane) copolymer, 3 wt. % to 35 wt. %, preferably 5 wt. % to 35 wt. %, of the acrylic copolymer based impact modifier, 0.005 wt. % to 0.1 wt. % of the antioxidant such as octadecyl-3-[3,5-di-tert-butyl-4-hydroxyphenyl]propionate], 0.01 wt. % to 1 wt. % of the flame retardant such as tris-isobutylated triphenyl phosphate, 0.01 wt. % to 1 wt. % of the UV absorber such as benzotriazoles containing UV absorber, 0.01 wt. % to 1 wt. % of the mold release agent such as pentaerythritol tetrastearate, or 0.01 wt. % to 1 wt. % of the pigment such as anthraquinone-based green colorant and a perinone-based solvent dye, or any combination thereof.

In some aspects, a thermoplastic composition of the present invention, e.g. a molded sample, can have a notched Charpy impact strength greater than 7 $kJ/m^2$; or equal to or greater than 8 $kJ/m^2$; preferably 9 $kJ/m^2$ to 12 $kJ/m^2$ at 23° C., 4.2 J, as measured in accordance with ISO 179/1. In some aspects, a thermoplastic composition of the present invention, e.g. molded sample, can have a notched Izod impact strength greater than 7 $kJ/m^2$, preferably 7.5 $kJ/m^2$ to 11 $kJ/m^2$ at 23° C., 2.75 J, as measured in accordance with ISO 180. In some aspects, a thermoplastic composition of the present invention, e.g. a molded sample, can have a tensile chord modulus greater than 1900 MPa, preferably 1950 MPa to 2300 MPa at 23° C., 50 mm/min as measured in accordance with ISO 527. In some aspects, a thermoplastic composition of the present invention, e.g. a molded sample, can have a tensile stress at yield greater than 45 MPa, preferably 46 MPa to 57 MPa at 23° C., as measured in accordance with ISO 527. In some aspects, a thermoplastic composition of the present invention, e.g. a molded sample, can have a tensile stress at break greater than 40 MPa, preferably 41 MPa to 44 MPa at 23° C., as measured in accordance with ISO 527. In some aspects, the thermoplastic composition of the present invention, a e.g. a molded sample, can have a tensile strain at yield greater than 3%, preferably 3.5% to 5% at 23° C., as measured in accordance with ISO 527. In some aspects, a thermoplastic composition of the present invention, e.g. a molded sample, can have a MAI, puncture energy greater than 10 J, such as 10.5 J to 15 J at 23° C., 4.4 m/s as measured in accordance with ISO 6603. In some aspects, a thermoplastic composition, e.g. a molded sample, of the present invention can have a MAI, energy at max force greater than 8 J, such as 8.5 J to 20 J at 23° C., as measured in accordance with ISO 6603. In some aspects, a thermoplastic composition of the present invention, e.g. molded sample, can have a MAI, deflection at break greater than 5 mm, such as 5.5 mm to 9 mm at 23° C., as measured in accordance with ISO 6603. In some aspects, a thermoplastic compositions of the present invention, e.g. a molded sample, can have a heat deflection temperature (HDT) of 80° C. to 90° C. using a load of 0.45 MPa, and/or of 65° C. to 75° C. using a load of 1.8 MPa, at 4 mm as measured in accordance with ISO 75/Af. In some aspects, the notched Charpy impact strength, the notched Izod impact strength and/or the HDT can be measured with a 4 mm thick molded plaque. In some aspects, a thermoplastic compositions of the present invention can have a Melt Volume-Flow Rate (MVR) of 1 to 10 $cm^3/10$ min at 240° C., 2.16 Kg, 300 s, and/or of 1 to 10 $cm^3/10$ min at 240° C., 2.16 Kg, 900 s, as measured in accordance with ISO 1133. In some aspects, a thermoplastic compositions of the present invention, e.g. a molded sample, can have a hardness greater than 400 $N/mm^2$, preferably as 402 $N/mm^2$ to 550 $N/mm^2$, as measured in accordance with the Erichsen scratch hardness test at a force of 2 Newton (N). In some aspects, a thermoplastic compositions of the present invention, e.g. a molded sample, can have a pencil hardness as specified by D3363-92A of at least H at 0.75 kgf. Thermoplastic compositions of the present invention may also be colorable. In some aspects the thermoplastic compositions can have a high gloss black or piano black color. In some aspects, the thermoplastic compositions of the present invention can have any one of, any combination of, or all of the aforementioned properties. In some aspects, a thermoplastic composition of the present invention, e.g. a molded sample, can have a notched Charpy impact strength greater than 7 $kJ/m^2$; or equal to or greater than 8 $kJ/m^2$, preferable 9 $kJ/m^2$ to 12 $kJ/m^2$ at 23° C. 4.2 J, as measured in accordance with ISO 179/1, a notched Izod impact strength greater than 7 $kJ/m^2$, preferably 8 $kJ/m^2$ to 11 $kJ/m^2$ at 23° C., 2.75 J, as measured in accordance with ISO 180, and a pencil hardness as specified by D3363-92A of at least H at 0.75 kgf.

In some aspects, the thermoplastic compositions of the present invention can have a notched Charpy impact strength at 23° C., as measured in accordance with ISO 179/1, that is at least 350% higher, or at least 400% higher, or at least 450% higher, or at least 500% higher, than that of a substantially identical reference composition comprising PMMA instead of the poly(carbonate-siloxane) copolymer and the acrylic copolymer based copolymer, measured under same condition. As used herein, a "substantially identical reference composition" is a composition that includes the same components, and the same amounts of the components, as the example composition, except that the reference composition does not include the recited component (e.g., the poly(carbonate-siloxane) copolymer and the impact modifier is omitted). Where one component is removed, the wt. % of the removed component is added to the primary polymer in the composition. Thus, if an example composition includes 58 wt. % PMMA, 20 wt. % poly(carbonate-siloxane) copolymer, 20 wt. % impact modifier and 2 wt. % other components, a substantially identical reference composition that does not include the poly(carbonate-siloxane) copolymer and impact modifier includes 98 wt. % PMMA and 2 wt. % of the same other components as the example composition.

The thermoplastic compositions of the present invention can be extruded, blow-molded, or injection-molded thermoplastic compositions. In some aspects, the thermoplastic compositions can be comprised in or in the form of a film, a layer, or a sheet. In some aspects, the thermoplastic compositions can be comprised in or formed into an article of manufacture. In some aspects, the article of manufacture can be an automobile part, a consumer electronics housing, a personal equipment part, or a home appliance component. In some particular aspects, the article of manufacture can be an automobile part. The article of manufacture can be an extruded, a blow-molded, or an injection-molded article.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions the invention can be used to achieve methods of the invention.

The following includes definitions of various terms and phrases used throughout this specification.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm" refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The thermoplastic composition of the present invention can "comprise," "consist(s) essentially of" or "consist of" particular ingredients, components, compositions, etc. disclosed throughout the specification. In one aspect of the present invention, and with reference to the transitional phrase "consist(s) essentially of" or "consisting essentially of," a basic and novel characteristic of the present invention can include the thermoplastic compositions having (1) good scratch resistance and/or (2) high impact strength properties.

All publications mentioned herein are incorporated herein by reference to disclose and describe the methods and/or materials in connection with which the publications are cited.

Other objects, features and advantages of the present invention will become apparent from the following detailed description and examples. It should be understood, however, that the detailed description and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DETAILED DESCRIPTION OF THE INVENTION

A discovery has been made that may provide a solution to at least some of the problems associated with PMMA and PC containing thermoplastic compositions. In one aspect, the discovery can include a thermoplastic composition containing 55 wt. % to 85 wt. % of a poly(methyl methacrylate) (PMMA) or copolymers thereof, 2 wt. % to 25 wt. % of a poly(carbonate-siloxane) copolymer having a siloxane content of 30 wt. % to 50 wt. %, and an acrylic copolymer based impact modifier. As illustrated in a non-limiting manner in the Examples, polymer compositions of the current invention can have higher Charpy impact (notched) and comparable pencil hardness value compared to comparative compositions without poly(carbonate-siloxane) copolymer and an acrylic copolymer based impact modifier.

These and other non-limiting aspects of the present invention are discussed in further detail in the following sections.

A. Scratch-Resistant and High Impact Strength Thermoplastic Compositions

The thermoplastic compositions of the present invention can contain i) 55 wt. % to 85 wt. %, preferably 60 wt. % to 80 wt. %, more preferably 65 wt. % to 75 wt. %, or at least any one of, equal to any one of, or between any two of 55, 56, 57, 58, 59, 60, 61, 62, 63, 64, 65, 66, 67, 68, 69, 70, 71, 72, 73, 74, 75, 76, 77, 78, 79, 80, 81, 82, 83, 84 and 85 wt. % of the poly(methyl methacrylate) (PMMA) or copolymers thereof, ii) 2 wt. % to 25 wt. %, or 2 wt. % to 20 wt. %, or 2 wt. % to 18 wt. %, or 12 wt. % to 25 wt. %, or at least any one of, equal to any one of, or between any two 2, 3, 4, 5, 6, 7, 8, 9, 10, 11, 12, 13, 14, 15, 16, 17, 18, 19, 20, 21, 22, 23, 24 and 25 wt. % of the poly(carbonate-siloxane) copolymer, and iii) 3 wt. % to 35 wt. %, or 10 wt. % to 30 wt. %, or 12 wt. % to 28 wt. %, or 3 wt. % to 18 wt. % or at least any one of, equal to any one of, or between any two 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34 and 35 wt. % of the acrylic copolymer based impact modifier. The poly (carbonate-siloxane) copolymer can have a siloxane content of 30 wt. % to 50 wt. %, preferably 35 wt. % to 45 wt. %, or at least any one of, equal to any one of, or between any two 30, 31, 32, 33, 34, 35, 36, 37, 38, 39, 40, 41, 42, 43, 44, 45, 46, 47, 48, 49, and 50 wt. %, based on the total weight of the poly(carbonate-siloxane) copolymer.

In some aspects, the thermoplastic composition can contain i) 65 wt. % to 75 wt. %, or at least any one of, equal to any one of, or between any two of the 65, 66, 67, 68, 69, 70, 71, 72, 73, 74, and 75 wt. % PMMA or copolymers thereof; ii) 2 wt. % to 18 wt. %, or at least any one of, equal to any one of, or between any two 2, 3, 4, 5, 6, 7, 8, 9, 10, 11, 12, 13, 14, 15, 16, 17 and 18 wt. % of the poly(carbonate-siloxane) copolymer; and iii) 12 wt. % to 28 wt. %, or at least any one of, equal to any one of, or between any two 12, 13, 14, 15, 16, 17, 18, 19, 20, 21, 22, 23, 24, 25, 26, 27, and 28 wt. % of the acrylic copolymer based multilayer impact modifier.

In some aspects, the thermoplastic composition can contain i) 65 wt. % to 75 wt. %, or at least any one of, equal to any one of, or between any two of the PMMA or copolymers thereof; ii) 12 wt. % to 25 wt. % or at least any one of, equal to any one of, or between any two 12, 13, 14, 15, 16, 17, 18, 19, 20, 21, 22, 23, 24, and 25 wt. % of the poly(carbonate-siloxane) copolymer; and iii) 3 wt. % to 18 wt. %, or at least any one of, equal to any one of, or between any two 3, 4, 5, 6, 7, 8, 9, 10, 11, 12, 13, 14, 15, 16, 17 and 18 wt. % of the acrylic copolymer based impact modifier containing acrylic-styrene-acrylonitrile (ASA) polymer.

1. PMMA

The thermoplastic composition of the present invention can contain any suitable PMMA polymer or copolymer thereof. In some aspects, the PMMA can be a PMMA homopolymer and can be obtained by polymerization such as free-radical polymerization of PMMA monomer. In some aspects, the PMMA can be a PMMA copolymer and can be obtained by polymerization such as free-radical polymerization of PMMA monomer and other copolymerizable monomer(s). In some aspects, the PMMA copolymer can have a methyl methacrylate content of at least 70 wt. %, or at least 80 wt. %, or at least 90 wt. %, or at least 95 wt. %, of methyl methacrylate, based on the total weight of the PMMA copolymer.

In some aspects, the copolymerizable monomers can include alkyl(meth)acrylate monomers such as ethyl (meth) acrylate, propyl (meth)acrylate, n-butyl (meth)acrylate, tert-butyl (meth)acrylate, pentyl (meth)acrylate, or 2-ethylhexyl (meth)acrylate; (meth)acrylates derived from unsaturated alcohols such as oleyl (meth)acrylate, 2-propynyl (meth) acrylate, allyl (meth)acrylate or vinyl (meth)acrylate; aryl (meth)acrylates, such as benzyl (meth)acrylate or phenyl (meth)acrylate, where in each case the aryl can be unsubstituted or have up to four substituents; cycloalkyl (meth) acrylates, such as 3-vinylcyclohexyl (meth)acrylate, or bornyl (meth)acrylate; hydroxyalkyl (meth)acrylates, such as 3-hydroxypropyl (meth)acrylate, 3,4-dihydroxybutyl (meth) acrylate, 2-hydroxyethyl (meth)acrylate, or 2-hydroxypropyl (meth)acrylate; 1,4-butanediol (meth)acrylate; tetrahydrofurfuryl (meth)acrylate; vinyloxyethoxyethyl (meth) acrylate; ethylsulphinylethyl (meth)acrylate; 4-thiocyanatobutyl (meth)acrylate; ethyl sulphonylethyl (meth)acrylate; thiocyanatomethyl (meth)acrylate; methyl sulphinylmethyl (meth)acrylate; bis((meth)acryloyloxyethyl) sulphide; or trimethyloylpropane tri(meth)acrylate. In some aspects, the copolymerizable monomers can include amides of or nitrile derivatives of (meth)acrylic acid, such as N-(3-dimethylaminopropyl) (meth)acrylamide or (meth) acrylonitrile. In some aspects, the copolymerizable monomers can include 1-alkenes, such as 1-hexene, 1-heptene, or butene; branched alkenes, such as vinylcyclohexane, 3,3 dimethyl-1-propene, 3-methyl-1-diisobutylene, or 4-methyl-1-pentene; vinyl esters, such as vinyl acetate; styrene, omethylstyrene or oethylstyrene; substituted styrenes having ($C_{1-4}$ alkyl) or halogen substituent(s) on the ring, such as vinyltoluene, p-methylstyrene, mono-chlorostyrenes, dichlorostyrenes, tribromostyrenes, or tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinyl-pyrrolidone, 2-vinylpyrrolidone, N-vinylpyrrolidine, 3 vinylpyrrolidine, N-vinylcaprolactam, N-vinylbutyrolactam, vinyloxolane, vinylfuran, vinylthiophene, vinylthiolane, vinylthiazoles, hydrogenated vinylthiazoles, vinyloxazoles or hydrogenated vinyloxazoles; vinyl ethers; isoprenyl ethers; maleic acid derivatives, such as maleic anhydride, methylmaleic anhydride, maleimide, or methylmaleimide; or dienes, such as divinylbenzene.

A combination of different PMMA or copolymer thereof can be used, having, for example, different molecular weights or different monomeric units. The weight average molecular weight (Mw) of the PMMA or copolymer thereof, can vary within a wide range, the Mw usually being matched to the intended use and to the mode of processing of the composition. In some aspects, the Mw of the PMMA or copolymer thereof, can be 20,000 to 1,000,000 g/mol, or 50,000 to 500,000 g/mol or 80,000 to 300,000 g/mol, determined in accordance with ASTM D5296-11. In some aspects, the thermoplastic composition can contain a PMMA homopolymer. In some particular aspects, the PMMA homopolymer can have a MVR of 7 $cm^3$/10 min to 12 $cm^3$/10 at 240° C., 2.16 kg, 300 s as measured in accordance with ISO 1133.

Exemplary PMMA polymers include, but are not limited to, ACRYLITE POQ66, and ALTUGLAS V825T available from Evonik, PLEXIGLAS V920A available from Arkema, and combinations thereof. In certain aspects, commercially available PMMAs added with impact modifiers, such as acrylic-styrene-acrylonitrile (ASA) copolymers as impact modifier can also be used, and includes but are not limited to LURAN S KR2950 from Styrolution, LUPOL SG5009 from LG, STAREX WX-9950 UV from Lotte, HAM8580 from KumhoSunny, and GELOY XTWE480 from SABIC. Other impact-modified PMMAs include Altuglas® HFI-15 by Arkema and PLEXIGLAS® Resist AG100 by Rohm GmbH.

2. Poly(Carbonate-Siloxane Copolymer)

The poly(carbonate-siloxane) copolymer can include carbonate units and siloxane units. Suitable carbonate units are shown in formula (1)

(1)

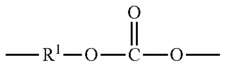

wherein at least 60 percent of the total number of $R^1$ groups can be aromatic, or each $R^1$ can contain at least one $C_{6-30}$ aromatic group. A combination of different $R^1$ groups can be present. The carbonate units can be derived from a dihydroxy compound such as an aromatic dihydroxy compound of formula (2) or a bisphenol of formula (3)

(2)

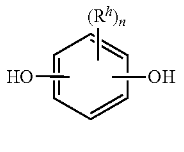

-continued (3)

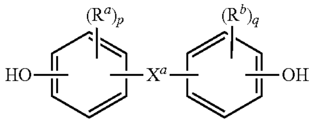

In some aspects, in formula (2), each $R^h$ can be independently a halogen atom such bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n can be integers of 0 to 4. In some aspects, in formula (2), each $R^h$ can be independently bromine, a $C_{1-3}$ alkyl, a halogen-substituted $C_{1-3}$ alkyl, and n can be 0 to 1.

In some aspects, in formula (3), $R^a$ and $R^b$ each can be independently a halogen, $C_{1-12}$ alkoxy, or $C_{1-12}$ alkyl; p and q each can be independently integers of 0 to 4, such that when p or q is less than 4, the valence of each carbon of the ring is filled by hydrogen; and $X^a$ can be a single bond, —O—, —S(O)—, —$S(O)_2$—, —C(O)—, a $C_{1-11}$ alkylidene of formula —$C(R^c)(R^d)$— wherein $R^c$ and $R^d$ each can be independently hydrogen or $C_{1-10}$ alkyl. In some aspects in formula (3), $R^a$ and $R^b$ each can be independently $C_{1-6}$ alkyl or $C_{1-3}$ alkoxy, and p and q each can be independently 0 to 1, and. In some particular aspects, in formula (3), p and q is each 0, or p and q is each 1; $R^a$ and $R^b$ are each a $C_{1-3}$ alkyl group, preferably methyl, disposed meta to the hydroxy group on each $C_6$ arylene group; and $X^a$ is a bridging group connecting the two hydroxy-substituted aromatic groups, where the bridging group and the hydroxy substituent of each $C_6$ arylene group are disposed para to each other on the $C_6$ arylene group, where $X^a$ can be a substituted or unsubstituted $C_{3-18}$ cycloalkylidene; a $C_{1-25}$ alkylidene of the formula —$C(R^c)(R^d)$— wherein $R^c$ and $R^d$ each can be independently hydrogen, $C_{1-12}$ alkyl, $C_{1-12}$ cycloalkyl, $C_{7-12}$ arylalkylene, $C_{1-12}$ heteroalkyl, or cyclic $C_{7-12}$ heteroarylalkylene, or a group of the formula —$C(=R^e)$— wherein $R^e$ is a divalent $C_{1-12}$ hydrocarbon group.

Examples of aromatic dihydroxy compound of formula (2) can include but are not limited to resorcinol; substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; or substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. In some aspects, a combination including different aromatic dihydroxy compounds can be used.

Examples of bisphenols of formula (3) can include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 2,7-dihydroxycarbazole, or the like. In some aspects, a combination including different bisphenols can be used.

In some aspects, the compound of formula (2) or formula (3) can include resorcinol, 2,2-bis(4-hydroxyphenyl) propane (bisphenol A or BPA), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, or 1,1-bis(4-hydroxyphenyl)-3,3,5-trimethylcyclohexane (TMC bisphenol).

In some aspects, the carbonate units can have the formula of formula (Ia)

(1a)

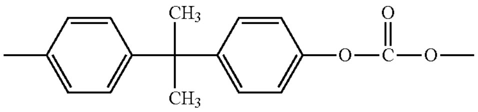

The siloxane units (also referred to as polysiloxane blocks) are optionally of formula (4)

(4)

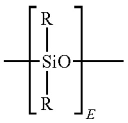

wherein each R can be independently a $C_{1-13}$ monovalent organic group. For example, each R can be independently a $C_{1-13}$ alkyl, C—$C_{13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with one or more of fluorine, chlorine, bromine, or iodine. In some aspects, where a transparent poly(carbonate-siloxane) copolymer is desired, R can be unsubstituted by a halogen. In some aspects, a combination of the foregoing R groups can be used in the same poly(carbonate-siloxane) copolymer.

In some aspects, each R can be independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In some aspects, each R can be independently methyl, trifluoromethyl, or phenyl.

The value of E in formula (4) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In some aspects, E can have an average value of 10 to 100 or 10 to 50. In some aspects, E can have an average value of 40 to 100, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly (carbonate-siloxane) copolymer can be used. A combination of a first and a second (or more) poly(carbonate-siloxane)s can be used, wherein the average value of E of the first copolymer is less than the average value of E of the second copolymer.

In some aspects, the siloxane units are of formula (5)

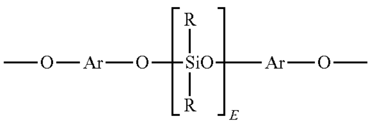

(5)

wherein E is as defined for formula (4); each R can be the same or different, and is as defined for formula (4); and each Ar can be the same or different, and can be independently a substituted or unsubstituted $C_6$-$C_{30}$ arylene, wherein the bonds can be directly connected to an aromatic moiety. Ar groups in formula (5) independently can be derived from a $C_6$-$C_{30}$ dihydroxyarylene compound, for example a dihydroxy compound of formula (2) or formula (3). Exemplary dihydroxyarylene compounds can be 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), or 1,1-bis(4-hydroxy-t-butylphenyl) propane.

Specific examples of siloxane units of formula (5) include those of the formulas (6a) and (6b)

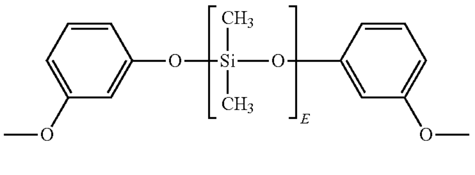

(6a)

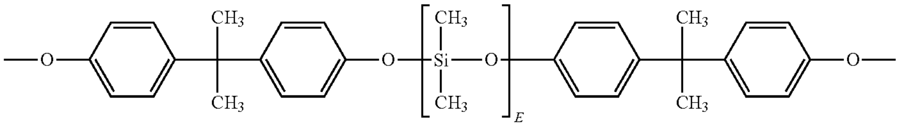

(6b)

wherein E is as described in Formula (4). In some aspects, E can have an average value of 10 to 80 or 10 to 40. In some aspects, E can have an average value of 40 to 80, or 40 to 70.

In some aspects, the siloxane units can be of formula (7)

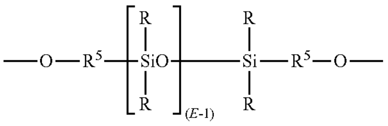

(7)

wherein R and E are as described for formula (4), and each $R^5$ can be independently a divalent $C_{1-30}$ hydrocarbylene group, and wherein the polymerized polysiloxane unit is the reaction residue of its corresponding dihydroxy compound. In some particular aspects, the siloxane units can be polydiorganosiloxane blocks of formula (8):

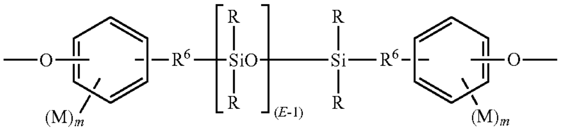

(8)

wherein R and E are as defined for formula (4). Each $R^6$ in formula (8) can be the same or different, and can be independently a divalent $C_{2-8}$ aliphatic group. Each M in formula (8) can be the same or different, and can be independently a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkylenoxy, $C_{7-12}$ alkylarylene, or $C_{7-12}$ alkylarylenoxy. Each m can independently be 0, 1, 2, 3, or 4.

In some aspects, in formula (8), M can be a halogen such as bromo or chloro, an alkyl such as methyl, ethyl, or propyl, an alkoxy such as methoxy, ethoxy, or propoxy, or an aryl such as phenyl, chlorophenyl, or tolyl; $R^6$ can be a dimethylene, trimethylene or tetramethylene; and R can be a $C_{1-8}$ alkyl haloalkyl such as trifluoropropyl, cyanoalkyl, or aryl such as phenyl, chlorophenyl or tolyl.

In some aspects, in formula (8), R can be methyl, or a combination of methyl and trifluoropropyl, or a combination of methyl and phenyl. In some aspects, in formula (8), R is methyl, M is methoxy, m is one, and $R^6$ is a divalent $C_{1-3}$ aliphatic group. Preferred polydiorganosiloxane blocks are of the formulas (8a)

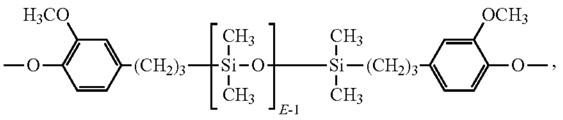

(8b)

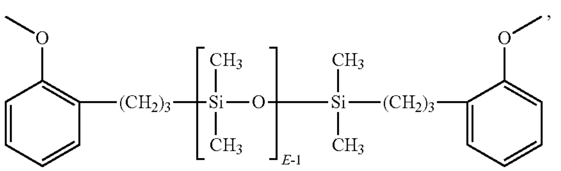

(8c)

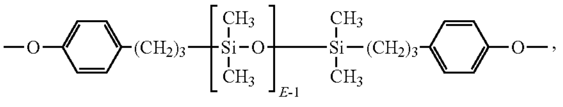

or a combination thereof, wherein E has an average value of 10 to 100, preferably 20 to 60, more preferably 30 to 50, or 40 to 50.

In an aspect, the poly(carbonate-siloxane) copolymer includes carbonate units derived from bisphenol A, and repeating siloxane units of formula (8a), (8b), (8c), or a combination thereof (preferably of formula 8a), wherein E has an average value of 10 to 100, or 20 to 60, or 30 to 60, or 40 to 60.

Suitable siloxane units have been described, for example, in WO 2008/042500 A1, WO 2010/076680 A1, and WO 2016/174592 A1, each of which are incorporated into the present application by reference.

The poly(carbonate-siloxane) copolymer can have a siloxane content of 25 to 55 wt. %, preferably 30 wt. % to 50 wt. %, more preferably 35 wt. % to 45 wt. %, still more preferably about 40 wt. % or at least any one of, equal to any one of, or between any two of 25, 30, 35, 40, 45, 50, and 55 wt. % based on the total weight of the poly(carbonate-siloxane) copolymer. As used herein, "siloxane content" of the poly(carbonate-siloxane) copolymer means the content of siloxane units based on the total weight of the poly (siloxane-carbonate).

In some aspects, the poly(carbonate-siloxane) copolymer can have a weight average molecular weight (Mw) of 25,000 to 50,000 Da, 26,000 to 45,000 Da, or 30,000 to 43,000 Da, or 35,000 to 40,000 Da as measured by gel permeation chromatography using a crosslinked styrene-divinyl benzene column, at a sample concentration of 1 milligram per milliliter, and as calibrated with bisphenol A polycarbonate standards. In some aspects, the poly(carbonate-siloxane) copolymer can have a weight average molecular weight of 10,000 to 100,000 Da, or 50,000 to 100,000 Da.

In an aspect, the poly(carbonate-siloxane) copolymers include carbonate units derived from bisphenol A and repeating siloxane units of formula (8a) (8b), or (8c) or a combination thereof (preferably of formula 8a), wherein E has an average value of 10 to 100, or 20 to 60, or 30 to 50, or 40 to 50, where the poly(carbonate-siloxane) copolymer can have a siloxane content of 35 wt. % to 45 wt. % and Mw of 25,000 to 50,000 Da.

While any suitable poly(carbonate-siloxane) copolymer may be used in the thermoplastic composition, in a particular aspect the poly(carbonate-siloxane) copolymer is ML7698, available from SABIC.

3. Impact Modifiers

The acrylic copolymer based impact modifier can contain an acrylic copolymer. In some aspects, the acrylic copolymer based impact modifier can contain acrylonitrile-butadiene-styrene polymer (ABS) such as bulk polymerized ABS (BABS), an acrylic-styrene-acrylonitrile (ASA) polymer, such as an acrylonitrile-styrene-butyl acrylate polymer, a methyl methacrylate-acrylonitrile-butadiene-styrene (MABS) polymer, a methyl methacrylate-butadiene-styrene (MB S) polymer, and an acrylonitrile-ethylene-propylene-diene-styrene (AES) polymer, or a combination thereof.

In some aspects, the acrylic copolymer based impact modifier can be a multilayer impact modifier having a multilayer structure having a core and one or more shells. The multilayer impact modifier can contain an acrylic graft copolymer. In some aspects, the core can be elastomeric and at least one shell can be rigid. In some aspects, the multilayer impact modifier can contain butyl acrylate as a rubber component. In some aspects, the multilayer impact modifier can contain butyl acrylate as a rubber component and methyl methacrylate polymer. In some aspects, the multilayer impact modifier can be a powdered product with a core-shell-shell structure. The core-shell-shell structure can contain a core (C) which is surrounded by a first shell (S1) which in turn is surrounded by a second shell (S2). The core and first shell e.g. inner shell, can be elastomeric and the second shell e.g. outer shell can be rigid. In some aspects, the weight ratio of C:(S1+S2) can be 10-40:60-90. The core and the first shell can contain an elastomeric (i.e., rubbery) polymer phase having a Tg less than 10° C., more specifically less than −10° C., or more specifically −40° to −80° C., The second shell can contain a rigid polymeric superstrate grafted to the elastomer phase. In some aspects, the core can contain a first butyl acrylate polymer. In some aspects, the first shell can contain a second butyl acrylate polymer. In some aspects, the second shell can contain at least 50.0 wt. % of a methyl methacrylate polymer based on the total weight of the second shell. In some aspects, the multilayer impact modifier can have a particle size of 100 to 1000 nanometers (nm), for example 150 to 500 nm, or 175 to 250 nm. In some aspects, the number average particle diameter of the multilayer impact modifier can be 30 to 400 nm.

In some aspects, the core of the multilayer impact modifier can contain: a core polymer containing, 40.0 to 99.9 wt. %, or 55.0 to 90.0 wt. %, of alkyl methacrylate repeat units, alkyl acrylate repeat units or styrenic repeat units; 0 to 59.9 wt. % of a copolymerizable monomer other than the alkyl methacrylate, alkyl acrylate, or styrenic repeat units; and 0.1 to 5.0 wt. % of a polyfunctional monomer, based on the total weight of the core. In some aspects, the core polymer can be a butyl acrylate polymer.

In some aspects, the first shell of the multilayer impact modifier can contain: a first shell polymer containing 50.0 to 99.9 wt. %, preferably 70 to 99 wt. % of a ($C_{2-8}$ alkyl) acrylate; 0 to 49.9 wt. %, preferably 0 to 29 wt. % of a copolymerizable vinyl monomer that is not an alkyl acrylate; and 0.1 to 10 wt. %, preferably 0.1 to 5.0 wt. % of a polyfunctional monomer, based on the total weight of the first shell. Polymerization of the monomers for the first shell in the presence of the core polymers may result in the core polymer being mainly distributed at the center portion of the impact modifier. In some aspects, the first shell polymer can be a butyl acrylate polymer.

In some aspects, the second shell of the multilayer impact modifier can be a graft component. In some aspects, second shell can contain homopolymer or a copolymer derived from a styrenic compound, (meth)acrylonitrile, (meth)acrylic acid, a ($C_{1-6}$ alkyl) (meth)acrylate, or a combination thereof. In some aspects, the second shell can contain, 50 to 100 wt. %, preferably 80 to 100 wt. % of methyl methacrylate repeat units; and 0 to 50 wt %, preferably 0 to 20 wt. % of a copolymerizable vinyl monomer other than the methyl methacrylate, based on the total weight of the outer shell. In some aspects, the outer shell polymer can be a methyl methacrylate polymer.

In some aspects, the multilayer impact can have a refractive index of 1.45 to 1.55, or 1.47 to 1.51, or about 1.49, or at least any one of, equal to any one of, or between any two of 1.45, 1.46, 1.47, 1.48, 1.49, 1.5, 1.50, 1.51, 1.52, 1.53, 1.54, and 1.55. In some aspects, the ratio of refractive indexes of the PMMA or copolymer thereof, and the multilayer impact modifier can be 1.05:1 to 1:1.05.

In some aspects, the rubber content of the acrylic copolymer based impact modifier can be 30 to 90 wt. %. Examples of the impact modifiers are described, for example, in US 2013/0184375 (Kaneka). In some particular aspects, the acrylic copolymer based impact modifier can be a powder product with having a multi-layer structure which comprises butyl acrylate as a rubber component, such as KANE ACE M-210 (produced by Kaneka), and the like.

In some particular aspects, the acrylic copolymer based impact modifier can contain an acrylic-styrene-acrylonitrile (ASA) polymer. In some particular aspects, the acrylic copolymer based impact modifier can be a multilayer impact modifier, such as multilayer impact modifier having a multilayer structure having a core and one or more shells.

Commercially available impact modifier can be used includes, but are not limited to DURASTRENGTH from Arkema, ELVALOY from Dow, PARALOID from Dow, ADVASTAB from PMC Group, ADVALUBE from PMC Group, INP984 from SABIC, and KANE ACE M-210 from Kaneka.

4. Additives

In some aspects the thermoplastic composition further includes one or more additives. The one or more additives may include, but are not limited to, a scratch-resistance agent, an antioxidant, a flame retardant, an UV absorber, a photochemical stabilizer, a filler, an optical brightener, a surfactant, a processing aid, a mold release agent, a pigment, or any combinations thereof. In some aspects, the one or more additive includes an antioxidant, an flame retardant, a UV absorber, a mold release agent, or one or more pigments or any combinations thereof.

Non-limiting examples of antioxidants include sterically hindered phenolic compounds, aromatic amines, a phosphite compound, carbon black and the like. Non-limiting examples of phenolic antioxidants include 2,6-di-tert-butyl-4-methylphenol (CAS No. 128-37-0), pentaerythfitol-tetrakis(3-(3,5-di-tert-butyl-4-hydroxyphenyl)propionate (CAS No. 6683-19-8), octadecyl 3-(3',5'-di-tert-butyl-4-hydroxyphenyl)propionate (CAS No. 2082-79-3), 1,3,5-trimethyl-2,4,6-tris-(3,5-di-tert-butyl-4-hydroxybenzyl)benzene (CAS No. 1709-70-2), 2,2'-thiodiethylenebis(3,5-di-tert-butyl-4-hydroxyphenyl)propionate (CAS No. 41484-35-9), calcium bis(ethyl 3,5-di-tert-butyl-4-hydroxybenzylphosphonate) (CAS No. 65140-91-2), 1,3,5-tris(3',5'-di-tert-butyl-4'-hydroxybenzyl)-isocyanurate (CAS No. 27676-62-6), 1,3,5-tris(4-tert-butyl-3-hydroxy-2,6-dimethylbenzyl)-1,3,5-triazine-2,4,6-(1H,3H, 5H)-trione (CAS No. 40601-76-1), 3,3-bis(3-tert-butyl-4-hydroxyphenyl)ethylene butyrate (CAS No. 32509-66-3), 4,4'-thiobis(2-tert-butyl-5-methylphenol) (CAS No. 96-69-5), 2,2'-methylene-bis-(6-(1-methyl-cyclohexyl)-para-cresol) (CAS No. 77-62-3), 3,3'-bis(3,5-di-tert-butyl-4-hydroxyphenyl)-N,N'-hexamethylenedipropionamide (CAS No. 23128-74-7), 2,5,7,8-tetramethyl-2-(4',8',12'-trimethyltridecyl)-chroman-6-ol (CAS No. 10191-41-0), 2,2-ethylidenebis(4,6-di-tert-butylphenol) (CAS No. 35958-30-6), 1,1,3-tris(2-methyl-4-hydroxy-5'-tert-butylphenyl) butane (CAS No. 1843-03-4), 3,9-bis(1,1-dimethyl-2-(beta-(3-tert-butyl-4-hydroxy-5-methylphenyl)propionyloxy) ethyl)-2,4,8,10-tetraoxaspiro[5.5]undecane (CAS No. 90498-90-1;), 1,6-hexanediyl-bis(3,5-bis(1,1-dimethylethyl)-4-hydroxybenzene)propanoate) (CAS No. 35074-77-2), 2,6-di-tert-butyl-4-nonylphenol (CAS No. 4306-88-1), 4,4'-butylidenebis(6-tert-butyl-3-methylphenol (CAS No. 85-60-9); 2,2'-methylene bis(6-tert-butyl-4-methylphenol) (CAS No. 119-47-1), triethylenglycol-bis-(3-tert-butyl-4-hydroxy-5-methylphenyl)propionate (CAS No. 36443-68-2), a mixture of $C_{13}$ to $C_{15}$ linear and branched alkyl esters of 3-(3',5'-di-tert-butyl-4'-hydroxyphenyl)propionic acid (CAS No. 171090-93-0), 2,2'-thiobis(6-tert-butyl-para-cresol) (CAS No. 90-66-4), diethyl-(3,5-di-tert-butyl hydroxybenzyl)phosphate (CAS No. 976-56-7), 4,6-bis (octylthiomethyl)-ortho-cresol (CAS No. 110553-27-0), benzenepropanoic acid, octyl 3-(3,5-di-tert-butyl hydroxyphenyl) propanoate (CAS No. 125643-61-0), 1,1,3-tris[2-methyl-4-[3-(3,5-di-tert-butyl-4-hydroxyphenyl)propionyloxy]-5-tert-butylphenyl]butane (CAS No. 180002-86-2), mixed styrenated phenols (CAS No. 61788-44-1), butylated, octylated phenols (CAS No. 68610-06-0), butylated reaction product of p-cresol and dicyclopentadiene (CAS No. 68610-51-5) or any combinations thereof. In some aspects, the thermoplastic composition can include 0.005 to 0.1 wt. %, of an antioxidant such as a sterically hindered phenolic compound.

Exemplary UV absorber suitable for use in aspects of the disclosure include, but are not limited to, hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis(4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers. In some aspects, the thermoplastic composition can include 0.01 to 1 wt. %, of a benzotriazole containing UV absorber an UV absorber such as 2-(2-hydroxy-5-tert-octylphenyl)benzotriazole.

The flame retardant can be an organophosphate containing flame retardant. Exemplary flame retardants suitable for use in aspects of the disclosure include, but are not limited to, diphenyl pentaerythritol diphosphate, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl) p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, triphenyl phosphate, tricresyl phosphate, isopropylated triphenyl phosphate, tris-isobutylated triphenyl phosphate or any combination thereof. In some aspects, the flame retardant can be tris-isobutylated triphenyl phosphate. In some aspects, the thermoplastic composition can include 0.01 to 1 wt. %, of an flame retardant such as tris-isobutylated triphenyl phosphate.

There is considerable overlap among plasticizers, lubricants, and mold release agents, which include, for example phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like, phosphates such as Bisphenol A bis(diphenyl phosphate) (BPADP), resorcinol bis (diphenyl phosphate) (RDP), and SOLDP (a proprietary oligomeric phosphate additive supplied by ICL Industrial Products). Non-limiting examples of a lubricant such as mold release agent include glycerol monostearate, pentaerythritol tetrastearate, or a combination that includes at least one of the foregoing, preferably wherein the mold release agent is glycerol monostearate. In some aspects, the thermoplastic composition can include 0.01 to 1 wt. % of a mold release agent such as pentaerythritol tetrastearate.

Pigments can include organic dyes. Non-limiting examples of organic dyes include Solvent Blue 97, Solvent Violet 36, Solvent Red 135, and/or Solvent Green 3. In some aspects, the thermoplastic composition can include pigments such as Solvent green 3 and Solvent red 135, with total concentration of 0.01 wt. % to 1 wt. %.

In some aspects, the thermoplastic composition can contain i) 55 wt. % to 85 wt. %, preferably 60 wt. % to 80 wt. %, more preferably 65 wt. % to 75 wt. %, of a PMMA homopolymer, ii) 2 wt. % to 25 wt. %, preferably 2 wt. % to 20 wt. %, more preferably 2 wt. % to 18 wt. % of a poly(carbonate-siloxane) copolymer, where the poly(carbonate-siloxane) copolymer can have a siloxane content of 35 wt. % to 45 wt. %, and iii) 5 wt. % to 35 wt. %, preferably 10 wt. % to 30 wt. %, more preferably 12 wt. % to 28 wt. % the acrylic graft copolymer containing multilayered impact modifier.

In some aspects, the thermoplastic composition can contain i) 55 wt. % to 85 wt. %, preferably 60 wt. % to 80 wt. %, more preferably 65 wt. % to 75 wt. %, of a PMMA homopolymer, ii) 2 wt. % to 25 wt. %, preferably 2 wt. % to 20 wt. %, more preferably 2 wt. % to 18 wt. % of a poly(carbonate-siloxane) copolymer, where the poly(carbonate-siloxane) copolymer can have a siloxane content of 35 wt. % to 45 wt. %, iii) 5 wt. % to 35 wt. %, preferably 10 wt. % to 30 wt. %, more preferably 12 wt. % to 28 wt. % of the acrylic graft copolymer containing multilayered impact modifier, iv) 0.005 wt. % to 0.1 wt. % of an antioxidant such as octadecyl-3-[3,5-di-tert-butyl-4-hydroxyphenyl]propionate], v) 0.01 wt. % to 1 wt. % of the flame retardant such as tris-isobutylated triphenyl phosphate, vi) 0.01 wt. % to 1 wt. % of the UV absorber such as a benzotriazoles containing UV absorber, vii) 0.01 wt. % to 1 wt. % of the mold release agent such as pentaerythritol tetrastearate, and viii) 0.01 wt. % to 1 wt. % of the pigment such as anthraquinone-based green colorant and a perinone-based solvent dye.

In some aspects, the thermoplastic composition can contain i) 55 wt. % to 85 wt. %, preferably 60 wt. % to 80 wt. %, more preferably 65 wt. % to 75 wt. %, of a PMMA homopolymer, ii) 2 wt. % to 25 wt. %, preferably 12 wt. % to 25 wt. %, of a poly(carbonate-siloxane) copolymer, where the poly(carbonate-siloxane) copolymer can have a siloxane content of 35 wt. % to 45 wt. %, iii) 3 wt. % to 35 wt. %, preferably 3 wt. % to 18 wt. %, of the acrylic copolymer based impact modifier containing acrylic-styrene-acrylonitrile (ASA) polymer, iv) 0.005 wt. % to 0.1 wt. % of an antioxidant such as octadecyl-3-[3,5-di-tert-butyl-4-hydroxyphenyl]propionate], v) 0.01 wt. % to 1 wt. % of the flame retardant such as tris-isobutylated triphenyl phosphate, vi) 0.01 wt. % to 1 wt. % of the UV absorber such as a benzotriazoles containing UV absorber, vii) 0.01 wt. % to 1 wt. % of the mold release agent such as pentaerythritol tetrastearate, and viii) 0.01 wt. % to 1 wt. % of the pigment such as anthraquinone-based green colorant and a perinone-based solvent dye.

B. Methods for Making the Thermoplastic Compositions

The thermoplastic compositions of the present invention can be made by various methods known in the art such as extrusion, injection molding or like. For example the components, such as the PMMA or copolymer thereof, the poly(carbonate-siloxane) copolymer, the impact modifier, and one or more additives, can be mixed together and then melt-blended to form the thermoplastic composition. The melt blending of the components can include use of shear force, extensional force, compressive force, ultrasonic energy, electromagnetic energy, thermal energy or combinations comprising at least one of the foregoing forces or forms of energy.

In some aspects, the one or any foregoing components described herein may be first dry blended with each other, or dry blended with any combination of foregoing components, then fed into an extruder from one or multi-feeders, or separately fed into an extruder from one or multi-feeders. The fillers can be optionally used in the invention. In some aspects, the fillers can be first processed into a masterbatch, then fed into an extruder. The components may be fed into the extruder from a throat hopper or any side feeders. The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations comprising at least one of the foregoing. The extruder can generally be operated at a temperature higher than that necessary to cause the composition to melt and flow. In some aspects, the temperature of the melt in the extruder barrel can be maintained as low as possible in order to avoid excessive thermal degradation of the components. The melted composition exits extruder through small exit holes in a die. The extrudate can be quenched in a water bath and pelletized. The pellets so prepared can be of any desired length (e.g., one-fourth inch long or less). Such pellets can be used for subsequent molding, shaping, or forming.

Mixtures including any combination of the foregoing mentioned components may be subjected to multiple blending and forming steps if desirable. For example, the thermoplastic composition may first be extruded and formed into pellets. The pellets may then be fed into a molding machine where it may be formed into any desirable shape or product. In some aspects, the thermoplastic composition emanating from a single melt blender may be formed into sheets or strands and subjected to post-extrusion processes such as annealing, uniaxial or biaxial orientation.

In some aspects, a thermoplastic composition of the present invention has any one of, any combination of, or all of the following properties i) a notched Charpy impact strength greater than 7 kJ/$m^2$; or equal to or greater than 8 kJ/$m^2$, preferably 9 kJ/$m^2$, 9.5 kJ/$m^2$, 10 kJ/$m^2$, 10.5 kJ/$m^2$, 11 kJ/$m^2$, 11.5 kJ/$m^2$ to 12 kJ/$m^2$ (or any ranges or values derivable therein) at 23° C., 4.2 J, as measured in accordance with ISO 179/1; ii) a notched Izod impact strength greater than 7 kJ/$m^2$, preferably 8 kJ/$m^2$, 8.5 kJ/$m^2$, 9 kJ/$m^2$, 9.5 kJ/$m^2$, 10 kJ/$m^2$, 10.5 kJ/$m^2$, to 11 kJ/$m^2$ (or any ranges or values derivable therein) at 23° C., 2.75 J, as measured in accordance with ISO 180; iii) a tensile chord modulus greater than 1900 MPa, preferably 1950 MPa, 2000 MPa, 2050 MPa, 2100 MPa, 2150 MPa, 2200 MPa, 2250 MPa to 2300 MPa (or any ranges or values derivable therein) at 23° C., 50 mm/min as measured in accordance with ISO 527; iv) a tensile stress at yield greater than 45 MPa, preferably 47 MPa, 48 MPa, 49 MPa, 50 MPa, 51 MPa, 52 MPa, 53 MPa, 54 MPa, 55 MPa, 56 MPa to 57 MPa (or any ranges or values derivable therein) at 23° C., as measured in accordance with ISO 527; v) a hardness greater than 400 N/$mm^2$, preferably as 402 N/$mm^2$, 410 N/$mm^2$, 420 N/$mm^2$, 430 N/$mm^2$, 440 N/$mm^2$, 450 N/$mm^2$, 460 N/$mm^2$, 470 N/$mm^2$, 480 N/$mm^2$, 490 N/$mm^2$, 500 N/$mm^2$, 510 N/$mm^2$, 520 N/$mm^2$, 530 N/$mm^2$, 540 N/$mm^2$ to 550 N/$mm^2$ (or any ranges or values derivable therein), as measured in accordance with the Erichsen scratch hardness test at a force of 2 Newton (N); and vi) a pencil hardness as specified by D3363-92A of at least H at 0.75 kgf. In some aspects, a thermoplastic composition of the present invention, such as sheet, layer or the like, containing the thermoplastic composition, can make low noise when rubbed (e.g. slided) against a second sheet or layer, where the second sheet or layer can be made of the same or different composition. In some aspects, a thermoplastic composition of the present invention has a risk priority number (RPN) score of 7 or below, or below 6.5, or below 6, or below 5, or below 4, or below 3, or below 2, or below 1.5, such as 1, 1.5, 2, 3, 4, 5, 6, 6.5, to 7 (or any ranges or values derivable therein) measured using Buzz, Squeak, Rattle (BSR) performance test at 1 to 20 N normal force and at velocity 1 to 30 mm/s while paired against itself (e.g. a material containing the same thermoplastic composition); and/or a RPN score of 5 or below, or below 4, or below 3, or below 2, or below 1.5, or below 1 such as 0.5, 1, 1.5, 2, 3, 4, 5, (or any ranges or values derivable therein) measured using BSR performance test at 1 to 20 N normal force and at velocity 1 to 30 mm/s test while paired against a composition containing polycarbonate and acrylonitrile butadiene styrene polymer, such as CYCOLOY™ Resin LG9000 supplied by SABIC.

The Buzz, Squeak, Rattle (BSR) performance test mentioned herein were performed as follows: BSR performance test for the thermoplastic compositions were performed using Ziegler Instruments SSP-04 test bench instrument. The thermoplastic compositions were rated/scored using a Risk Priority Number (RPN) rating system. The RPN rating system, estimates the risk of a material pair creating noise when sliding against each other, and is an accepted rating system in the automotive industry for evaluation of automotive interior materials. RPN score of a material, when paired (e.g. slided) against a second material (can be the same material (, e.g. the two material that are slided against each other have same composition) or different material) is calculated as $$RPN=(1\times\text{impulse grade}+1\times\text{acceleration grade}+2\times\text{groan grade})/4 \quad (1)$$

Testing was performing using forces of 1 N to 20 N (normal force applied by the force head of the instrument on which a first material is mounted) and velocities of 5 to 30 mm/s (of the sliding side of the instrument on which the second material sample (that is paired against the first sample for RPN measurement) is attached). Table 1 show the testing profile used. The test profile can be commenced and controlled by a computer program through a controller to the instrument.

TABLE 1

Test profile

| | Normal Force [N] | | | | | | | | | | | |
|---|---|---|---|---|---|---|---|---|---|---|---|---|
| | 1 | 1 | 1 | 1 | 5 | 5 | 5 | 5 | 10 | 10 | 10 | 10 |
| Velocity [mm/s] | 5 | 10 | 20 | 30 | 5 | 10 | 20 | 30 | 5 | 10 | 20 | 30 |

| | Normal Force [N] | | | | | | | |
|---|---|---|---|---|---|---|---|---|
| | 15 | 15 | 15 | 15 | 20 | 20 | 20 | 20 |
| Velocity [mm/s] | 5 | 10 | 20 | 30 | 5 | 10 | 20 | 30 |

For each force measurement, testing was done for velocities 5, 10, 20 and 30 mm/s. The measurements were taken by starting with the lowest force (1 N), after testing for the velocities, from lowest (5 mm/s) to highest velocities (30 mm/s), the next higher force was applied and readings at the programed velocities were taken. This was continued through the highest force (20N) setting. The testing was replicated thrice using different samples. The overall RPN (of the first material paired against the second material) was then calculated by a Ziegler program for each condition of Force and velocity. Average overall RPN score was then generated from the three replicates.

The samples for the tests were generated using a standard plaque mold under molding conditions recommended for the material resin grade. Force head samples (first material) were cut using a standard band saw with any flash removed from edges with a de-burring knife. The surfaces of both the force head sample and the sliding side sample where cleaned with methanol prior to testing to remove any residual oils from molding or cutting equipment. Samples were preconditioned at room temperature and humidity and run under these same conditions.

C. Articles of Manufacture

The thermoplastic composition of the present invention can be comprised in an article of manufacture. Aspects of the disclosure also relate to articles including the thermoplastic composition described herein. In some aspects the article is a film, a sheet, a molded article, a welded article, a filament or a powder. In one example, the composition is incorporated into a film. Specifically, the film may include at least one film layer that includes the thermoplastic composition. In further aspects the film includes at least a second film layer. The second film layer may include a scratch-resistant hard coat. Other film layers may include other materials.

The article can be a consumer product. In some aspects the article can be an automotive component. In some aspects, the article can be consumer electronic housing. Example articles include, but are not limited to, exterior automobile components (grill, mirror housing, pillar, spoiler, logo, roof rail, bezel, trim, fender, etc.), interior automobile components (decorative parts, electronic housings, instrument panel components, navigation system, housing frames, etc.), storage boxes, a personal equipment part, a home appliance component, furniture, appliance housings (e.g., robot cleaners, drones, etc.), and consumer electronics devices (e.g., device housings or components for laptops, phones, tablets, batteries, wireless charging, AR/VR goggles, etc.). Exemplary multilayer articles include but are not limited to a cap-layer in sheet, a top-layer or an intermediate layer in a multi-layer assembly (e.g., for electronics, photovoltaics, (O)LED), film for insert molding or in-mold decoration, top-layer for composite, etc.).

In some aspects the article can be an automotive bumper, an automotive exterior component, an automotive interior component, an automobile mirror housing, an automobile wheel cover, an automobile instrument panel or trim, an automobile glove box, an automobile door hardware or other interior trim, an automobile exterior light, an automobile part within the engine compartment, an agricultural tractor or device part, a window or a component thereof, a construction equipment vehicle or device part, a marine or personal water craft part, an all-terrain vehicle or all-terrain vehicle part, plumbing equipment, a valve or pump, an air conditioning heating or cooling part, a furnace or heat pump part, a computer housing, a computer housing or business machine housing or part, a housing or part for monitors, a computer router, a desk top printer, a large office/industrial printer, an electronics part, a projector part, an electronic display part, a copier part, a scanner part, an electronic printer toner cartridge, a handheld electronic device housing, a housing for a hand-held device, a hair drier, an iron, a coffee maker, a toaster, a washing machine or washing machine part, a microwave, an oven, a power tool, an electric component, an electric enclosure, a lighting part, a component for a lighting fixture, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lens (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a component for a medical application or a device, an electrical box or enclosure, and an electrical connector, a construction or agricultural equipment, and a turbine blade.

In further aspects the article is a component of an aircraft interior or a train interior, an access panel, access door, air flow regulator, air gasper, air grille, arm rest, baggage storage door, balcony component, cabinet wall, ceiling panel, door pull, door handle, duct housing, enclosure for an electronic device, equipment housing, equipment panel, floor panel, food cart, food tray, galley surface, handle, housing for television, light panel, magazine rack, telephone housing, partition, part for trolley cart, seat back, seat component, railing component, seat housing, shelve, side wall, speaker housing, storage compartment, storage housing, toilet seat, tray table, tray, trim panel, window molding, window slide, a balcony component, baluster, ceiling panel, cover for a life vest, cover for a storage bin, dust cover for a window, layer of an electrochromic device, lens for a television, electronic display, gauge, or instrument panel, light cover, light diffuser, light tube, light pipes, mirror, partition, railing, refrigerator door, shower door, sink bowl, trolley cart container, trolley cart side panel, or window.

In the context of the present invention, at least the following 21 aspects are described. Aspect 1 is directed to a thermoplastic composition containing 55 wt. % to 85 wt. % of a poly(methyl methacrylate) (PMMA) or copolymers thereof; 2 wt. % to 25 wt. % of a poly(carbonate-siloxane) copolymer, wherein the poly(carbonate-siloxane) copolymer has a siloxane content of 30 wt. % to 50 wt. %; and an acrylic copolymer based impact modifier. Aspect 2 is directed to the thermoplastic composition of aspect 1, comprising 3 wt. % to 35 wt. %, preferably 5 wt. % to 35 of the impact modifier. Aspect 3 is directed to the thermoplastic composition of aspects 1 or 2, wherein the impact modifier comprises butyl acrylate polymer and methyl methacrylate polymer and has a multilayer structure. Aspect 4 is directed to the thermoplastic composition of any one of aspects 1 to 3, wherein the impact modifier can contains a butyl acrylate polymer containing core, a butyl acrylate polymer containing an inner shell surrounding the core, and a methyl methacrylate polymer containing outer shell surrounding the inner shell. Aspect 5 is directed to the thermoplastic composition of aspect 4, wherein, the core and the inner shell are elastomeric, and the outer shell is rigid. Aspect 6 is directed to the thermoplastic composition of any one of aspects 1 to 5, wherein the PMMA is PMMA homopolymer with a MVR 7 of $cm^3$/10 min to 12 $cm^3$/10 at 240° C., 2.16 kg, 300 s as measured in accordance with ISO 1133. Aspect 7 is directed to the thermoplastic composition of any one of aspects 1 to 6, wherein the poly(carbonate-siloxane) copolymer include repeating carbonate units derived from bisphenol A and repeating siloxane units of formula (8a) with average E value of 40 to 50, where the poly(carbonate-siloxane) copolymer has a siloxane content of 35 wt. % to 45 wt. % and Mw of 50,000 to 100,000 Da. Aspect 8 is directed to the thermoplastic composition of any one of aspects 1 to 7, containing 60 wt. % to 80 wt. % of the PMMA or copolymers thereof. Aspect 9 is directed to the thermoplastic composition of any one of aspects 1 to 8, containing 65 wt. % to 75 wt. %, of the PMMA or copolymers thereof. Aspect 10 is directed to the thermoplastic composition of any one of aspects 3 to 9, containing 2 wt. % to 20 wt. %, preferably 2 wt. % to 18 wt. %, of the poly(carbonate-siloxane) copolymer and 10 wt. % to 30 wt. %, preferably 12 wt. % to 28 wt. % of the acrylic copolymer based multilayer impact modifier containing butyl acrylate polymer and methyl methacrylate polymer. Aspect 11 is directed to thermoplastic composition of any one of aspects 1 to 2 and 6 to 9, containing 12 wt. % to 25 wt. %, of the poly(carbonate-siloxane) copolymer and 3 wt. % to 18 wt. % of the acrylic copolymer based impact modifier, wherein the acrylic copolymer based impact modifier contains acrylic-styrene-acrylonitrile (ASA) polymer. Aspect 12 is directed to the thermoplastic composition of any one of aspects 1 to 11, wherein the poly(carbonate-siloxane) copolymer has a siloxane content of 35 wt. % to 45 wt. %, based on the total weight of the poly(carbonate-siloxane) copolymer. Aspect 13 is directed to the thermoplastic composition of any one of aspects 1 to 12, further comprising one or more additives selected from the group consisting of a scratch-resistance agent, an antioxidant, a flame retardant, an UV absorber, a photochemical stabilizer, a filler, an optical brightener, a surfactant, a processing aid, a mold release agent, a pigment, or any combinations thereof. Aspect 14 is directed to the thermoplastic composition of aspect 13, comprising 0.005 wt. % to 0.1 wt. % of the antioxidant, 0.01 wt. % to 1 wt. % of the flame retardant, 0.01 wt. % to 1 wt. % of the UV absorber, 0.01 wt. % to 1 wt. % of the mold release agent, or 0.01 wt. % to 1 wt. % of the pigment or any combination thereof. Aspect 15 is directed to the thermoplastic composition of any one of aspects 1 to 14, comprising any one of, a combination of, or all of the following properties: a notched Charpy impact strength greater than 7 kJ/$m^2$; or equal to or greater than 8 kJ/$m^2$, preferable 9 kJ/$m^2$ to 12 kJ/$m^2$ at 23° C., 4.2 J, as measured in accordance with ISO 179/1; a notched Izod impact strength greater than 7 kJ/$m^2$, preferably 8 kJ/$m^2$ to 11 kJ/$m^2$ at 23° C., 2.75 J, as measured in accordance with ISO 180; a tensile chord modulus greater than 1900 MPa, preferably 1950 MPa to 2300 MPa at 23° C., 50 mm/min as measured in accordance with ISO 527; a tensile stress at yield greater than 45 MPa, preferably 47 MPa to 57 MPa at 23° C., as measured in accordance with ISO 527; a hardness greater than 400 N/$mm^2$, preferably as 402 N/$mm^2$ to 550 N/$mm^2$, as measured in accordance with the Erichsen scratch hardness test at a force of 2 Newton (N); and/or a pencil hardness as specified by D3363-92A of at least H at 0.75 kgf. Aspect 16 is directed to the thermoplastic composition of any one of aspects 1 to 15, comprising the following properties: a notched Charpy impact strength greater than 7 kJ/$m^2$; or equal to or greater than 8 kJ/$m^2$, preferable 9 kJ/$m^2$ to 12 kJ/$m^2$ at 23° C., 4.2 J, as measured in accordance with ISO 179/1; a notched Izod impact strength greater than 7 kJ/$m^2$, preferably 8 kJ/$m^2$ to 11 kJ/$m^2$ at 23° C., 2.75 J, as measured in accordance with ISO 180; and a pencil hardness as specified by D3363-92A of at least H at 0.75 kgf. Aspect 17 is directed to the thermoplastic composition of any one of aspects 1 to 16, wherein the composition is comprised in a film, layer, or a sheet. Aspect 18 is directed to the thermoplastic composition of any one of aspects 1 to 17, wherein the composition is an extruded, a blow-molded, or an injection-molded thermoplastic composition. Aspect 19 is directed to an article of manufacture containing the thermoplastic composition of any one of aspects 1 to 18. Aspect 20 is directed to the article of manufacture of aspect 19, wherein the article of manufacture is an automobile part, a consumer electronics housing, a personal equipment part, or a home appliance component. Aspect 21 is directed to the article of manufacture of aspect 20, wherein the article of manufacture is an automobile part.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Low Scratch and High Impact Strength Thermoplastic Compositions Containing a Multilayer Acrylic Copolymer Based Impact Modifier Molded-in-color, black-colored thermoplastic compositions, C1-C9, with concentrations (wt. %) as shown in Table 2 were prepared by pre-blending and extrusion. Extrusion conditions used are shown in Table 3. The properties of the compositions are shown in Table 4

TABLE 2

| Compositions | | | | | | | | | |
|---|---|---|---|---|---|---|---|---|---|
| | C-1 | C-2 | C-3 | C-4 | C-5 | C-6 | C-7 | C-8 | C-9 |
| PMMA, Altuglas ® V920 | 69 | 69 | 69 | 69 | 69 | 69 | 69 | 59 | 79 |
| Poly(carbonate-siloxane) copolymer, siloxane content 40% | | 5 | 10 | 15 | 20 | 25 | 30 | 20 | 10 |
| Kane Ace ™ M210 | 30 | 25 | 20 | 15 | 10 | 5 | | 20 | 10 |
| IRGANOX 1076 | 0.05 | 0.05 | 0.05 | 0.05 | 0.05 | 0.05 | 0.05 | 0.05 | 0.05 |
| Tris-isobutylated triphenyl phosphate (TBPP) | 0.10 | 0.10 | 0.10 | 0.10 | 0.10 | 0.10 | 0.10 | 0.10 | 0.10 |
| 2-(2-hydroxy-5-tert-octylphenyl)benzotriazole | 0.30 | 0.30 | 0.30 | 0.30 | 0.30 | 0.30 | 0.30 | 0.30 | 0.30 |
| Pentaerythritol tetrastearate (PETS) | 0.30 | 0.30 | 0.30 | 0.30 | 0.30 | 0.30 | 0.30 | 0.30 | 0.30 |
| Solvent Green 3 | 0.13 | 0.13 | 0.13 | 0.13 | 0.13 | 0.13 | 0.13 | 0.13 | 0.13 |
| Solvent Red 135 | 0.13 | 0.13 | 0.13 | 0.13 | 0.13 | 0.13 | 0.13 | 0.13 | 0.13 |

TABLE 3

| Extrusion conditions | | |
|---|---|---|
| Description | Unit | Quantity |
| Pre-drying time | h | 6 |
| Pre-drying temp | ° C. | 75 |
| Hopper temp | ° C. | 40 |
| Zone 1 temp | ° C. | 210-220 |
| Zone 2 temp | ° C. | 220-230 |
| Zone 3 temp | ° C. | 230-240 |
| Nozzle temp | ° C. | 225-235 |

TABLE 3-continued

| Extrusion conditions | | |
|---|---|---|
| Description | Unit | Quantity |
| Mold temp | ° C. | 50-60 |
| Screw speed | NA | 100 |
| Back pressure | bar | 5 |
| Decompression | mm | 0 |

TABLE 4

| Properties of the compositions | | | | | | | | | | |
|---|---|---|---|---|---|---|---|---|---|---|
| Test | Unit | C-1 | C-2 | C-3 | C-4 | C-5 | C-6 | C-7 | C-8 | C-9 |
| Charpy Impact, notched, 4 mm, 23° C., 4.2 J ISO 179/1 | $kJ/m^2$ | 8.2 | 9.3 | 9.7 | 11.0 | 6.8 | 7.5 | 8.2 | 9.6 | 2.8 |
| Charpy Impact, un-notched, 4 mm, 23° C., 4.2 J ISO 179/1 | $kJ/m^2$ | 79.90 | 78.40 | 91.37 | 95.66 | 82.39 | 81.05 | 30.92 | 99.80 | 47.83 |
| Izod Impact, notched, 4 mm 23° C., 2.75 J, ISO 180 | $kJ/m^2$ | 6.12 | 7.51 | 8.52 | 9.39 | 9.1 | 12.56 | 11 | 11.05 | 6.42 |
| Tensile, chord modulus, 23° C., 50 mm/min ISO 527 | MPa | 1928 | 1958 | 1990 | 2011 | 2121 | 2171 | 2204 | 1739 | 2414 |
| Tensile, stress at yield, 23° C., ISO 527 | MPa | 50.44 | 46.96 | 47.71 | 48.43 | 51.61 | 53.37 | 54.48 | 43.85 | 57.53 |
| Tensile, stress at break, 23° C., ISO 527 | MPa | 41.71 | 41.31 | 42.39 | 41.74 | 43.1 | 42.76 | 44.50 | 38.19 | 43.45 |
| Tensile, strain at yield, 23° C., ISO 527 | % | 5.04 | 4.04 | 3.99 | 4.00 | 4.03 | 4.25 | 4.27 | 4.26 | 4.50 |
| MAI, puncture energy, 23° C., 4.4 m/s ISO 6603 | J | 2.78 | 10.54 | 12.58 | 13.14 | 15.32 | 13.02 | 9.82 | 22.12 | 5.12 |
| MAI, energy at max force, 23° C., ISO 6603 | J | 2.38 | 9.66 | 10.20 | 8.98 | 11.34 | 8.70 | 8.26 | 19.92 | 4.42 |
| MAI, deflection at break, 23° C., ISO 6603 | mm | 2.68 | 5.98 | 6.42 | 7.24 | 7.88 | 7.20 | 6.20 | 8.52 | 5.72 |
| Hardness (Erichsen scratch test), 2N | $N/mm^2$ | 445 | 433 | 429 | 425 | 406 | 402 | 410 | 344 | 480 |
| Pencil hardness 0.75 kgf, ASTM D3363 - 92A | a.u. | 2H | H | 2H | H | F | F | HB | HB | 2H |
| Heat deflection temperature (HDT), 0.45 MPa stress, 4 mm plaque, ISO 75/Af | ° C. | 82.3 | 83.1 | 84.0 | 84.1 | 87.2 | 87.9 | 92.0 | 87.3 | 89.7 |
| HDT, 1.8 MPa stress, 4 mm plaque ISO 75/Af | ° C. | 69.1 | 70.4 | 70.0 | 71.0 | 71.2 | 75.3 | 77.7 | 73.3 | 76.15 |
| Melt Volume-Flow Rate (MVR), 240° C., 2.16 Kg, 300 s, ISO 1133 | $cm^3/10$ min | 3.00 | 3.04 | 3.08 | 2.97 | 3.04 | 2.54 | 2.09 | 1.36 | 4.17 |
| MVR, 240° C., 2.16 Kg, 900 s, ISO 1133 | $cm^3/10$ min | 2.81 | 2.98 | 3.06 | 2.92 | 3.02 | 2.50 | 2.10 | 1.45 | 4.64 |

As can be seen from Table 4, compositions C-2 to 4, have good impact strength and scratch resistance and have high Charpy impact (notched), good pencil hardness value and good Erichsen scratch hardness. Compared to C-2 to 4, composition C-1 has low impact strength. Compared to C-2 to 4, compositions, C-5 to 8 have low scratch resistance. Compared to C-2 to 4, composition C-9 has low impact strength and scratch resistance.

TABLE 5

| (Materials Comparison) | | | | | |
|---|---|---|---|---|---|
| Test | Standard | Unit | C-4 | Altuglas ® V920 | Altuglas ® HFI-15* |
| Charpy Impact, notched, 4 mm, 23° C. | ISO 179/1 | $kJ/m^2$ | 11 | 2 | 6.5 |
| Tensile, chord modulus, 23° C. | ISO 527 | MPa | 2011 | 3260 | — |
| Tensile, Stress at Yield, 23° C. | ISO 527 | MPa | 48 | 69 | 50 |
| Hardness (Erichsen scratch test), 2N | — | $N/mm^2$ | 425 | 658 | — |
| Pencil hardness, 0.75 kgf | ASTM D3363-92A | a.u. | H | 4H | — |

*Technical datasheet value

When compared to pristine ALTUGLAS® V920, molded composition C-4, displays a significantly higher Charpy impact (notched) while keeping an excellent pencil hardness value (Table 4). When compared with impact-modified PMMAs ALTUGLAS® HFI-15, composition C-4 displays a higher Charpy impact (notched) and, tensile stress at yield. Results from Table 4 and 5, shows including an acrylate based impact modifier, and a poly(carbonate-siloxane) copolymer with PMMA significantly increases impact strength while keeping excellent scratch resistance.

Example 2

Low Scratch and High Impact Strength Thermoplastic Compositions Containing an Acrylic Copolymer Based Impact Modifier Containing Acrylic-Styrene-Acrylonitrile (ASA) Polymer Molded-in-color, thermoplastic compositions, E1-E5, with concentrations (wt. %) as shown in Table 6 were prepared by pre-blending and extrusion. Extrusion conditions and molding conditions used are shown in Table 7 and 8. The properties of the compositions are shown in Table 10.

TABLE 6

| Composition | | | | | |
|---|---|---|---|---|---|
| Item description | E1 | E2 | E3 | E4 | E5 |
| PMMA, Altuglas ® V920 | 69 | 69 | 71 | 74 | 79 |
| Poly(carbonate-siloxane) copolymer, siloxane content 40% | 10 | 15 | 22.5 | 22.5 | 10 |
| ASA containing impact modifier INP984 (wt. %) | 20 | 15 | 5 | 2.5 | 10 |

TABLE 7

| Extrusion conditions | | |
|---|---|---|
| Description | Unit | Quantity |
| Drying time | h | 6 |
| Drying temp | ° C. | 75 |
| Hopper temp | ° C. | 40 |
| Calibrator temp | ° C. | 40-60 |
| Zone 1 temp | ° C. | 180-200 |
| Zone 2 temp | ° C. | 200-220 |
| Zone 3 temp | ° C. | 230-250 |
| Zone 4 temp | ° C. | 250-260 |
| Zone 9 temp | ° C. | 255-260 |
| Screw speed | a.u. | 300 |

TABLE 8

| Molding conditions | | |
|---|---|---|
| Description | Unit | Quantity |
| Drying time | h | 6 |
| Drying temp | ° C. | 75 |
| Hopper temp | ° C. | 40 |
| Zone 1 temp | ° C. | 210-220 |
| Zone 2 temp | ° C. | 220-230 |
| Zone 3 temp | ° C. | 230-240 |
| Nozzle temp | ° C. | 225-235 |
| Mold temp | ° C. | 50-60 |
| Screw speed | a.u. | 100 |
| Back pressure | bar | 5 |

TABLE 9

| Test results | | | | | | |
|---|---|---|---|---|---|---|
| Test | Units | E1 | E2 | E3 | E4 | E5 |
| Charpy Impact, notched, 4 mm, 23° C. (ISO 179/1) | $kJ/m^2$ | 7 | 9 | 9 | 8 | 5 |
| Charpy Impact, un-notched, 4 mm, 23° C. (ISO 179/1) | $kJ/m^2$ | 65 | 76 | 68 | 58 | 55 |
| Izod Impact, notched, 4 mm, 23° C. (ISO 180) | $kJ/m^2$ | 8 | 9 | 9 | 8 | 5 |
| Tensile, Modulus, 23° C. (ISO527) | MPa | 2288 | 2212 | 2227 | 2313 | 2531 |
| Tensile, Stress@Yield, 23° C. (ISO527) | MPa | 53 | 53 | 55 | 58 | 61 |
| Tensile, Stress@Break, 23° C. (ISO527) | MPa | 46 | 44 | 45 | 45 | 47 |

TABLE 9-continued

| Test results | | | | | | |
|---|---|---|---|---|---|---|
| Test | Units | E1 | E2 | E3 | E4 | E5 |
| Tensile, Strain@Yield, 23° C. (ISO527) | % | 4 | 4 | 4 | 5 | 5 |
| MAI, Puncture energy, 23° C. (ISO 6603) | J | 9 | 11 | 9 | 11 | 5 |
| MAI, Energy@max force, 23° C. (ISO 6603) | J | 8 | 6 | 6 | 9 | 4 |
| MAI, Deflection@break, 23° C. (ISO 6603) | mm | 6 | 7 | 6 | 6 | 4 |
| Hardness (Erichsen scratch test) @ 2N | $N/mm^2$ | 410 | 402 | 402 | 425 | 480 |
| Pencil hardness, 0.75 kgf (ASTM D3363) | 0.75 Kgf | 3H | H | 2H | 2H | 3H |
| HDT, 0.45 MPa (ISO 75/Af) | ° C. | 91 | 92 | 93 | 94 | 93 |
| HDT, 1.8 MPa (ISO 75/Af) | ° C. | 76 | 78 | 79 | 80 | 80 |
| MVR, 240° C., 2.16 Kg, 300 s, (ISO 1133) | $cm^3$/10 min | 3 | 3 | 3 | 3 | 4 |
| MVR, 240° C., 2.16 Kg, 900 s, (ISO 1133) | $cm^3$/10 min | 3 | 3 | 3 | 3 | 5 |
| Vicat | ° C. | 96 | 98 | 100 | 99 | 100 |

As can be seen from Table 9, compositions E2 and E3, have good impact strength and scratch resistance. When compared to the pristine Altuglas® V920 (e.g. without poly(carbonate-siloxane) copolymer and the impact modifier) as well as a PMMA/ASA GELOY XTWE480 resin, E2 and E3 display significantly higher Charpy impact (notched) and MAI puncture energy, while keeping excellent Erichsen hardness, pencil hardness and heat resistance values (Table 10). Properties of the compositions E2 and E3 are comparable with that of $C_4$ (Table 4).

TABLE 10

| Materials comparison | | | | | | |
|---|---|---|---|---|---|---|
| Test | Unit | E2 | E3 | C4 | Altuglas ® V920 | GELOY XTWE480 |
| Charpy Impact, notched, 4 mm, 23° C. (ISO 179/1) | $kJ/m^2$ | 9 | 9 | 11 | 2 | 5 |
| Tensile, Modulus, 23° C. (ISO527) | MPa | 2200 | 2200 | 2011 | 3300 | 2400 |
| MAI, Puncture energy, 23° C. (ISO 6603) | MPa | 11 | 9 | 13.14 | 2 | 3 |
| HDT, 1.8 MPa (ISO 75/Af) | ° C. | 78 | 79 | 71 | 74 | 77 |
| Hardness (Erichsen scratch test), 2N | $N/mm^2$ | 402 | 402 | 425 | 658 | 425 |
| Pencil hardness, 0.75 kgf | a.u. | H | 2H | H | 4H | 2H |

Example 3

BSR Performance Test of Composition $C_4$ Paired Against Itself and CYCOLOY™ Resin LG9000

Buzz, Squeak, Rattle (BSR) performance test for the composition $C_4$ was performed using Ziegler Instruments SSP-04 test bench instrument. An average RPN score for the composition $C_4$ paired against (e.g. slided against) itself, and against a composition containing a polycarbonate and acrylonitrile butadiene styrene (ABS) polymer was calculated. CYCOLOY™ Resin LG9000 from SABIC was used as a polycarbonate and ABS containing polymer. CYCOLOY™ Resin LG9000, is used for interior automotive applications. Testing was performed at forces of 1 N, 5 N, 10 N and 20 N (normal force applied by the force head of the instrument on which a first material is mounted) and at velocities of 5 mm/s, 10 mm/s, 20 mm/s to 30 mm/s (of the sliding side of the instrument on which a second material sample is attached) (see Table 1 above). For testing of composition $C_4$ against itself, both first and second material was made of composition $C_4$. For testing of composition $C_4$ against CYCOLOY™ Resin LG9000, the first material was made of composition $C_4$ and second material was made of CYCOLOY™ Resin LG9000. For each force measurement, testing was done for velocities 5, 10, 20 and 30 mm/s. Measurements were taken starting with the lowest force (1N), after testing for the velocities, from lowest (5 mm/s) to highest velocities (30 mm/s), the next higher force was applied and readings at the programed velocities were taken. This was continued through the highest force (20 N) setting. Three replicates were run. The overall RPN (calculated using equation (1), see above) was then calculated by a Ziegler program for each condition of Force and velocity, and overall average RPN calculated from the three replicates.

The samples for the tests were generated using a standard plaque mold under molding conditions recommended for the material resin grade. Force head (e.g. first material) samples were cut using a standard band saw with any flash removed from edges with a de-burring knife. The surfaces of both the force head sample and the sliding side sample (e.g. second material) where cleaned with Methanol prior to testing to remove any residual oils from molding or cutting equipment. Samples were pre-conditioned at room temperature and humidity and run under these same conditions. The instrument measures and records the humidity and temperature at each measurement.

The average RPN value of composition C4, paired against itself was 6.5, and paired against CYCOLOY™ Resin LG9000 was 2.2. An RPN of <3 is generally accepted as "low risk for noise generation" for any pairing of materials.

Method of examples described herein can be machine or computer implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, nontransitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A thermoplastic composition comprising:
- 60 wt. % to 80 wt. % of a poly (methyl methacrylate) (PMMA) or copolymers thereof,
- 2 wt. % to 18 wt. % of a poly (carbonate-siloxane) copolymer having a siloxane content of 30 wt. % to 50 wt. %, based on the total weight of the poly(carbonate-siloxane) copolymer; and
- 12 wt. % to 30 wt % of an acrylic copolymer-based impact modifier.

2. The thermoplastic composition of claim 1, wherein the impact modifier comprises a butyl acrylate polymer and a methyl methacrylate polymer and has a multilayer structure.

3. The thermoplastic composition of claim 2, comprising:
- 65 wt. % to 75 wt. % of the PMMA or copolymers thereof,
- 5 wt. % to 18 wt. % of the poly (carbonate-siloxane) copolymer; and
- 12 wt. % to 28 wt. % of the acrylic copolymer based multilayer impact modifier comprising butyl acrylate polymer and a methyl methacrylate polymer.

4. An article of manufacture comprising the thermoplastic composition of claim 3.

5. An article of manufacture comprising the thermoplastic composition of claim 2.

6. The thermoplastic composition claim 1, comprising:
- 60 wt. % to 80 wt. % of the PMMA or copolymers thereof,
- 12 wt. % to 18 wt. % of the poly (carbonate-siloxane) copolymer; and
- 13 wt. % to 18 wt. % of the acrylic copolymer based impact modifier, wherein the acrylic copolymer based impact modifier comprises acrylic-styrene-acrylonitrile (ASA) polymer.

7. An article of manufacture comprising the thermoplastic composition of claim 6.

8. The thermoplastic composition claim 1, wherein the poly (carbonate-siloxane) copolymer has a siloxane content of 35 wt. % to 45 wt. %, based on the total weight of the poly (carbonate-siloxane) copolymer.

9. An article of manufacture comprising the thermoplastic composition of claim 8.

10. The thermoplastic composition claim 1, further comprising one or more additives selected from the group consisting of a scratch-resistance agent, an antioxidant, a flame retardant, an UV absorber, a photochemical stabilizer, a filler, an optical brightener, a surfactant, a processing aid, a mold release agent, a pigment, and any combinations thereof.

11. The thermoplastic composition of claim 10, comprising 0.005 wt. % to 0.1 wt. % of the antioxidant, 0.01 wt. % to 1 wt. % of the flame retardant, 0.01 wt. % to 1 wt. % of the UV absorber, 0.01 wt. % to 1 wt. % of the mold release agent, or 0.01 wt. % to 1 wt. % of the pigment or any combination thereof.

12. The thermoplastic composition claim 1, comprising any one of, a combination of, or all of the following properties:
- a notched Charpy impact strength greater than 7 $KJ/m^2$ at 23° C., 4.2 J, as measured in accordance with ISO 179/1;
- a notched Izod impact strength greater than 7 KJ/m at 23° C., 2.75 J, as measured in accordance with ISO 180;
- a tensile chord modulus greater than 1900 MPa at 23° C., 50 mm/min, as measured in accordance with ISO 527;
- a tensile stress at yield greater than 45 MPa at 23° C., as measured in accordance with ISO 527;
- a hardness greater than 400 $N/mm^2$, as measured in accordance with the Erichsen scratch hardness test at a force of 2 Newton (N);
- and/or
- a pencil hardness as specified by D3363-92A of at least H at 0.75 kgf.

13. The thermoplastic composition of claim 12, comprising the following properties:
- a notched Charpy impact strength greater than 7 $KJ/m^2$ at 23° C., 4.2 J, as measured in accordance with ISO 179/1;
- a notched Izod impact strength greater than 7 $KJ/m^2$ at 23° C., 2.75 J, as measured in accordance with ISO 180; and
- a pencil hardness as specified by D3363-92A of at least H at 0.75 kgf.

14. The thermoplastic composition of claim 1, wherein the composition is comprised in a film, a layer, or a sheet.

15. The thermoplastic composition of claim 1, wherein the composition is an extruded, a blow-molded, or an injection-molded thermoplastic composition.

16. An article of manufacture comprising the thermoplastic composition of claim 1.

17. The article of manufacture of claim 16, wherein the article of manufacture is an automobile part, a consumer electronics housing, a personal equipment part, or a home appliance component.

18. The article of manufacture of claim 16, wherein the article of manufacture is an automobile part.

* * * * *